United States Patent
Teodorescu

(10) Patent No.: US 8,649,025 B2
(45) Date of Patent: Feb. 11, 2014

(54) METHODS AND APPARATUS FOR REAL-TIME DIGITIZATION OF THREE-DIMENSIONAL SCENES

(75) Inventor: Nicolae Paul Teodorescu, Mission Viejo, CA (US)

(73) Assignee: Micrometric Vision Technologies, Mission Viejo, CA (US)

( * ) Notice: Subject to any disclaimer, the term of this patent is extended or adjusted under 35 U.S.C. 154(b) by 43 days.

(21) Appl. No.: 13/331,099

(22) Filed: Dec. 20, 2011

(65) Prior Publication Data

US 2012/0092680 A1 Apr. 19, 2012

Related U.S. Application Data

(63) Continuation-in-part of application No. 12/748,397, filed on Mar. 27, 2010, now Pat. No. 8,339,616.

(60) Provisional application No. 61/425,200, filed on Dec. 20, 2010.

(51) Int. Cl.
*G01B 11/14* (2006.01)

(52) U.S. Cl.
USPC .......................................................... 356/625

(58) Field of Classification Search
USPC .......................................................... 356/625
See application file for complete search history.

(56) References Cited

U.S. PATENT DOCUMENTS

| | | | |
|---|---|---|---|
| 4,294,544 A * | 10/1981 | Altschuler et al. | 356/610 |
| 4,802,759 A | 2/1989 | Matsumoto et al. | |
| 6,006,126 A * | 12/1999 | Cosman | 600/426 |
| 6,167,151 A | 12/2000 | Albeck et al. | |
| 6,751,344 B1 | 6/2004 | Grumbine | |
| 6,876,458 B2 | 4/2005 | Kraus | |
| 7,184,893 B2 * | 2/2007 | Cramer et al. | 702/19 |
| 7,646,896 B2 | 1/2010 | Yukhin et al. | |
| 7,724,932 B2 | 5/2010 | Ernst et al. | |
| 7,911,503 B2 * | 3/2011 | Kobayashi | 348/222.1 |
| 2005/0128196 A1 | 6/2005 | Popescu et al. | |
| 2008/0031513 A1 | 2/2008 | Hart | |
| 2008/0118143 A1 | 5/2008 | Golrdon et al. | |
| 2009/0059241 A1 | 3/2009 | Lapa et al. | |
| 2010/0118123 A1 | 5/2010 | Freedman et al. | |

FOREIGN PATENT DOCUMENTS

GB  WO 93/03579  2/1993

\* cited by examiner

*Primary Examiner* — Tu Nguyen

(57) ABSTRACT

This concerns in part the invention disclosed by co-pending application, particularly to robust determination of features in projection patterns. Disclosed are novel methods and apparatus for obtaining range frame coordinates in moving scenes, where optical radiation is projected onto a scene in the form of dots and strips, where reflected radiation is picked up by a camera and range coordinates calculated thereof.

3 Claims, 5 Drawing Sheets

METHODS AND APPARATUS FOR REAL-TIME DIGITIZATION OF THREE-DIMENSIONAL SCENES

CROSS-REFERENCE TO RELATED APPLICATION

This application is continuation-in-part of application Ser. No. 12/748,397 filed on Mar. 27, 2010.

PRIORITY

Priority is claimed to Provisional Application No. 61/425,200, filed on Dec. 20, 2010

DESCRIPTION

1. Field of Invention

The present invention relates to general field of three-dimensional (3-D) digitization of physical objects and three-dimensional environments in particular to obtaining 3-D frames of dense measurements at rates suitable for moving scenes.

Disclosed are improvements and additional embodiments of my "Method and apparatus for high-speed unconstrained three-dimensional digitization" invention disclosed in co-pending application Ser. No. 12/748,397, particularly relating to novel 3-D digitizing techniques.

The invention further concerns digitization of 3-D scenes by optical triangulation, where patterns of randomly distributed dot features and linear strips are optically projected onto objects, and identified in a digital image.

2. Background of Invention

Real-time 3-D imaging systems are present in an increasingly diverse number of applications such as modeling, 3-D printing, biometrics, autonomous navigation, physical measurements and gesture input. Simplified operation and low-cost are essential for the ease of integration with a myriad of emerging technologies.

Digitization systems based on structured light and triangulation principle measure distance from sensing unit to object surface typically acquiring measurements representing 3-D coordinates from sensor's viewpoint.

An important aspect of this invention is the ability to digitize scenes, where relative motion exists, in absence of mechanical coupling or visual features affixed to scene; in other words, the ability to operate as hand-held devices by motioning about the object and/or while object shifts.

A number of digitizing methods are based on projecting one or more grid patterns onto objects, taking one or more digital images of illuminated object from a plurality of vantage points, where surface coordinates are obtained by processing acquired images.

U.S. Pat. No. 4,802,759 disclose a method where an object is illuminated by a grid pattern, which requires finding one reference line first, before other lines are identified in projected grid, therefore imposing a substantial object' surface smoothness assumption. The method disclosed in my co-pending application and the methods of current invention have no restriction on object shape or complexity, since strip identification is independent on detecting any other particular strip.

U.S. application No. 2009/0059241 and U.S. Pat. No. 7,646,896 utilize intensity-coded information, to carry out identification by analyzing pattern intensity variations, from which strips have to be recognized. The robustness of decoding may be adversely impacted by a number of conditions, such as object geometry, texture, local contrast variance, which restricts applicability only to certain geometry classes.

U.S. Pat. No. 6,751,344 B1 describes a method in which the subject is successively illuminated with a matrix of dots from a plurality of projectors, where a plurality of images taken from a plurality of vantage points is analyzed to extract the contour of an object.

U.S. Application 20100118123 A1, whose disclosure is incorporated herein by reference, teaches of a speckle projector where a dot pattern is obtained from a diffractive optical element, and where depth information is obtained from evaluating the shift of dots relative to a reference image, detected by way of block correlation in frequency domain.

Because the speckle points appear at fixed spatial locations, pattern distribution cannot be controlled dynamically. More importantly, certain objects may exhibit features where strips projection would be necessary to extract local geometry, as speckle patterns can create feature round-offs, local distortions or miss details entirely, which produce unsuitable result and hence making it suitable for a small class of applications.

The present invention introduces novel digitizing methods where optically projected dots and strips are combined according to necessities to achieve accurate and detailed object modeling.

SUMMARY OF THE INVENTION

In the embodiments of present invention a pattern containing a predetermined amount of dots and mostly rectilinear strips is projected onto an object, and at least one digital picture of the pattern on the object is recorded by at least one image capture assembly coupled to at least one computing unit configured to process recorded image so as to calculate three-dimensional coordinate of the object.

The pattern on the object is projected by way of an optical device, configured to emanate optical radiation in accordance to a pattern forming assembly. One such projection device may be in the form of an assembly having at least one light source configured to transilluminate at least one transparency containing the pattern, so as to project the pattern onto the object. The projection assembly can also be in form of a micro-laser projector having at least one laser beam swiping across the object so as to from the pattern onto object where pattern is generated under computer control. The projection assembly can also be in the form of a micro-electro-mechanical-system (MEMS) micro-mirror projector, reflecting optical radiation under computer control as to form the pattern onto the object.

In one embodiment, light source include at least one light-emitting diode (LED). Alternatively, the light source may include at least one point source of optical radiation.

In one embodiment, patterns of dots and strips may originate from independent projection assemblies having common optical axis.

There is therefore provided, in accordance with embodiments of the present invention, an apparatus for obtaining range coordinates of a three-dimensional object, including:
  a projection assembly containing:
    an illumination assembly, configured to project at least one optical radiation;
    a pattern forming assembly, configured to generate at least one predetermined pattern;
    an optical assembly configured to project the at least one predetermined pattern onto an object;

an image capture assembly comprising at least one image sensor configured to record at least one digital frame of the pattern projected onto the object; and a computing unit configured to process the digital frames recorded by the image capture assembly so as to calculate the three-dimensional coordinates of the object. The computing unit can be in the form of a multiprocessing machine where computation is distributed to multiple processing elements and where processing tasks perform in parallel. The computing unit is coupled to projection and capture assembly by means of local connections or over a network link.

This document contains further disclosure on my co-pending application Ser. No. 12/748,397, to address following aspects:

1. Robust disambiguation of crossing (nodal) points when epipolar test returns multiple matches, which may arise when at least two nodals are on or close to same epipolar band. An epipolar band is the region of uncertainty along epipolar line for which point coordinates inside the regions are considered belonging to respective epipolar. A novel pattern, consisting of randomly distributed dots and crossing strips is utilized where nodals and dots are incrementally identified in small neighborhoods. A remarkable advantage of this combination is its ability to substantially increase the number of range coordinates having a more uniform distribution in each range frame, which in turn increases digitization speed and robustness. As it will become clear further in this invention, dots identification is carried out at a step and is independent of strips configuration.

2. Robust disambiguation of intersecting strip pairs at each nodal, utilizing pixel coordinates of neighboring dots, and avoiding any nodal connectivity knowledge. Because strips in the image frame have projective consistency, disambiguation is obtained from observing the order of strip pixels around each nodal, on each side of epipolar line.

In cases were only one strips is visible on any side of the epipolar, each strip identity is established from adjacent dots position.

In accordance to another method of present invention, a pattern of randomly distributed dots is projected onto a scene, where at least a portion of illuminated scene is recorded in a digital frame, where dot coordinates are uniquely identified, and where frame coordinates are calculated by triangulation thereof.

In yet another method of present invention, a scene is illuminated by a pattern having a predetermined number of rectilinear strips and a plurality of randomly distributed dots, where the strips and dots are uniquely identified in at least one digital image, and where range coordinates are calculated by triangulation thereof.

DESCRIPTION OF PREFERRED EMBODIMENTS

Figure 1:
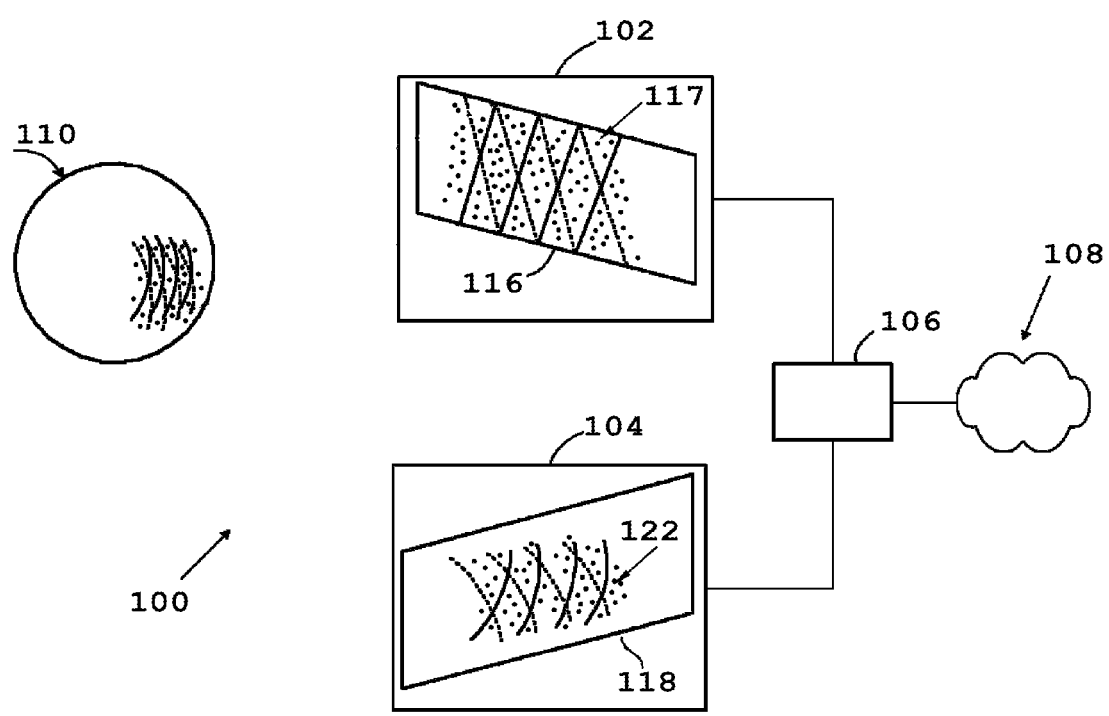
FIG. 1 is a schematic diagram of a scene digitizer system implementing a first method of present invention having a projection device radiating an object by crossing strip and dot patterns, fixed relative to an image sensor, capturing reflected radiation, electrically coupled to a computer having a network connection.

FIG. 1 represents schematically a scene digitizer setup 100, where projector 102 emanates an optical radiation pattern from frame 116, onto the scene, under computer 106 control. Projection pattern comprises two sets of strips mostly parallel, crossing each other, represented by solid and dashed segments respectively, and a set of non-overlapping dots 117, having coordinates chosen at random.

At least a portion of the scene 110 is illuminated by the optical radiation emanating from projector 102.

A digital image of at least a portion of reflected radiation is captured by camera 104 and recorded at image frame 118 under computer 106 control, which has connecting means to network 108. The portion of reflected dots 122 are distinguishable groupings of pixels recorded at frame 118.

For the following explanation the term dot is substitute for dot's position coordinate.

Figure 2:
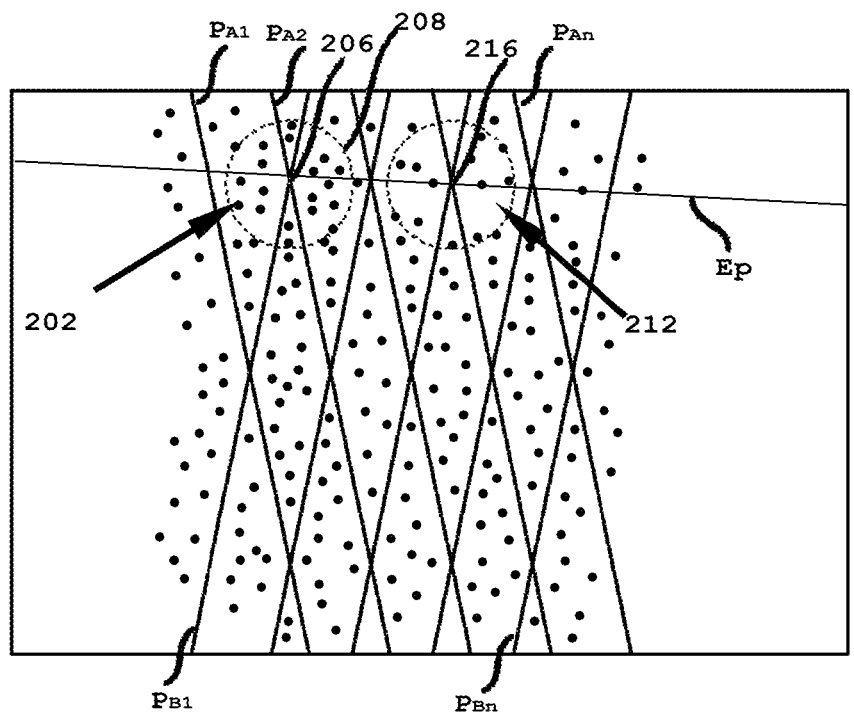
FIG. 2 is an exemplary depiction of strip and dot pattern in projector's frame.

FIG. 2 depicts strips in frame 116 exemplary represented by $P_{A1}$-$P_{An}$, and $P_{B1}$-$P_{Bn}$, and exemplary nodals 206, 216.

Figure 3:
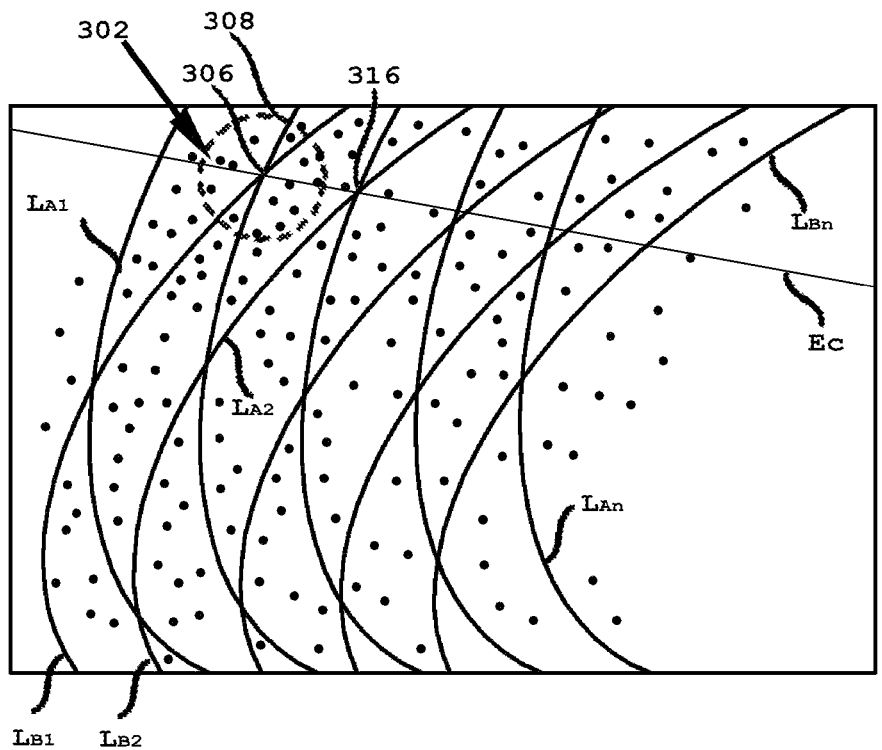
FIG. 3 is an exemplary depiction of strip and dot pattern captured at image sensor's frame.

FIG. 3 depicts strips in frame 118 exemplary represented by $L_{A1}$-$L_{A2}$ and $L_{B1}$-$L_{B2}$ which correspond to at least a subset of $P_{A1}$-$P_{An}$, and $P_{B1}$-$P_{Bn}$, and exemplary nodals 306, 316.

When nodals in 118 are identified by carrying out the techniques as described in co-pending application, it is possible to devise a strip configuration (periodicity, angularity) such that unambiguous identification exists, i.e. no two nodals share same epipolar band.

Practical applications may require unrestricted configurations, for example, to allow configuration to change dynamically.

In accordance to the first method of present invention, there is provided a step of calculating coordinates of dots 122 in image frame with sub-pixel accuracy. This can be achieved, for example, by detecting the pixels of each dot and computing corresponding centers of gravity.

Nodal identification is carried out according to method of co-pending application, and includes determination of "colliding" nodals, i.e. nodals on same epipolar band. Further, colliding nodals are disambiguated as described below.

To illustrate the method, nodals 206, 216 share epipolar Ep, and nodals 306, 316 share epipolar Ec.

Dots in proximity of 206, 216 and 306 are searched and subsets 202, 212 and 302 respectively, selected.

Subsets are further divided in two groups, with one group on each side of epipolar line passing through respective nodal. For example, subsets 202, 212 are divided by epipolar Ep; subset 302 is divided by epipolar Ec. Match-test of a particular dot is performed over corresponding groups. For example, a dot in 302 above epipolar Ec is match-tested against dots above epipolar line Ep in 202 and 212.

To carry out disambiguation, epipolar match-test is performed over at least a fraction of dots in each candidate set, counting the number of matches at each set.

When a predetermined majority of counts (votes) is collected in favor of a single candidate, nodal identity is assigned to that candidate.
The minimum number of votes is subject to tradeoffs between processing speed and enough percentage to discriminate between nodal candidates.

The process is repeated until all colliding nodals identities are disambiguated.

Disambiguation has low computational complexity because it consists of few simple operations which can perform very fast since it lends itself to parallel processing implementation.

This way, dots in vicinity of all nodal points also get identified. The identities of dots further away form the nodals can be obtained in proximity of previously identified dots, by applying the method described further in this invention.

Because of random distribution, unique matches are obtained in a small number of calculations when searched in vicinity of previously identified dos.

The search for nearest neighbors in image frame is facilitated by a number of well-known techniques, such as Kd-trees. Nearest neighbors in projector frame can be obtained at an initialization step, because relative positions do not change for a given pattern configuration.

Speed up is achieved by searching for matching neighborhoods along and epipolar direction, where match-tests are carried out over small subset of neighborhoods, suitable to parallel computation implementation and therefore can complete very fast.

Another aspect addressed by this invention with respect to co-pending application is improving ascertaining individual strip identities at each nodal, in absence of nodal-to-nodal connectivity graph.

To this end, nodal neighborhoods are analyzed to assess the presence of distinguishable strips on each side of local epipolar line. If both strips are detected on any side, their identities correspond directly to the order in the pattern for respective nodal.

However, visibility may be such that image contains insufficient strip information to conclude on strip order, where, for example, only pixels of one strip, on any side of epipolar is detected. To uniquely identify the singular strip, the configuration of observed neighboring dots is employed to pinpoint strip identity at that nodal.

At nodal locations, strips divide the space on each side of epipolar into three regions, each encompassing a number of dots. Because dots' relative position with respect to those of strips is known, at a setup step, dots are assigned supplemental attributes indicative of region they belong to.

To determine the identity of the singular strip, dots located on both sides of the strip are searched and region data retrieved. Then the signed distance between dots and strip pixels is calculated and its identity established form region data adjacency.

It will be appreciated that the embodiment described above is cited by way of example and that present method is not limited to what has been particularly shown and described. Rather, the scope of present invention includes combination and limit-cases of various features presented hereinabove.

One such example could comprise a pattern assembled of randomly distributed dots and strips of arbitrary length, where dots identification is carried out in same way as nodal points, where dense three-dimensional coordinates are obtained by triangulation.

Figure 4:
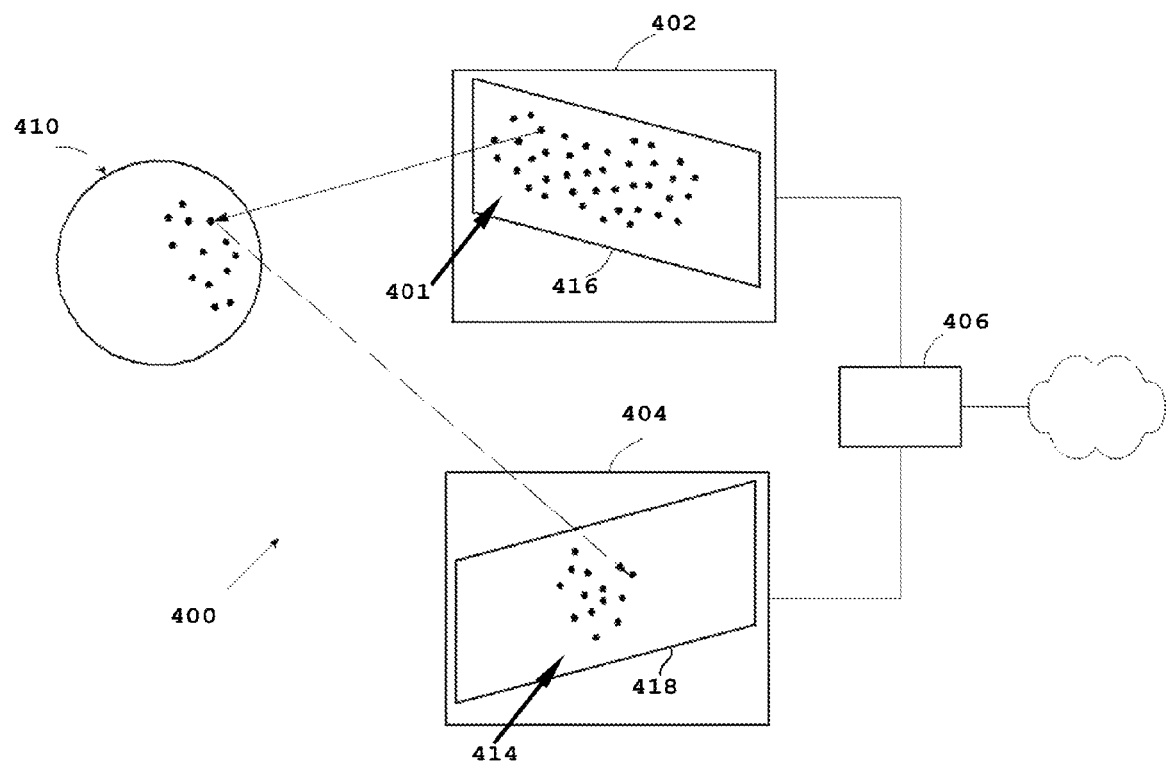
FIG. 4 is a schematic diagram of a scene digitizer system implementing a second method of present invention, having a projection device radiating an object by a random dot pattern, fixed relative to an image sensor, capturing reflected radiation, electrically coupled by a computer having a network connection.

In accordance to a second method of present invention, and deriving from the one presented above, and in reference to FIG. 4, camera-projector setup 400 is configured to illuminate object 410 with pattern of randomly distributed dots 401 emanating from projection device 402, and a image sensor 404 coupled to computer 406. Radiation reflected off object 410 is captured in a digital image at sensor 404, and stored in image frame 418, where image dots appear in the form of distinguishable pixels formations 414, characterized by pixel coordinates of center of gravity at each distinguishable pixel formation.

Figure 5:
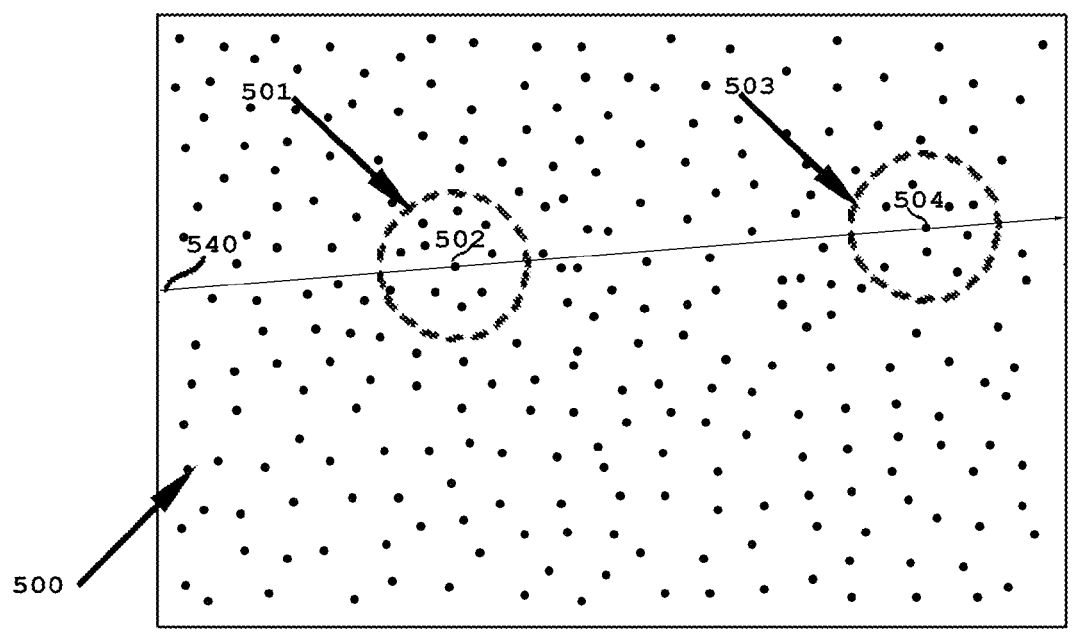
FIG. 5 is an exemplary depiction of random dot pattern in projector's frame, showing exemplary epipolar regions subject to voting scheme.
Figure 6:
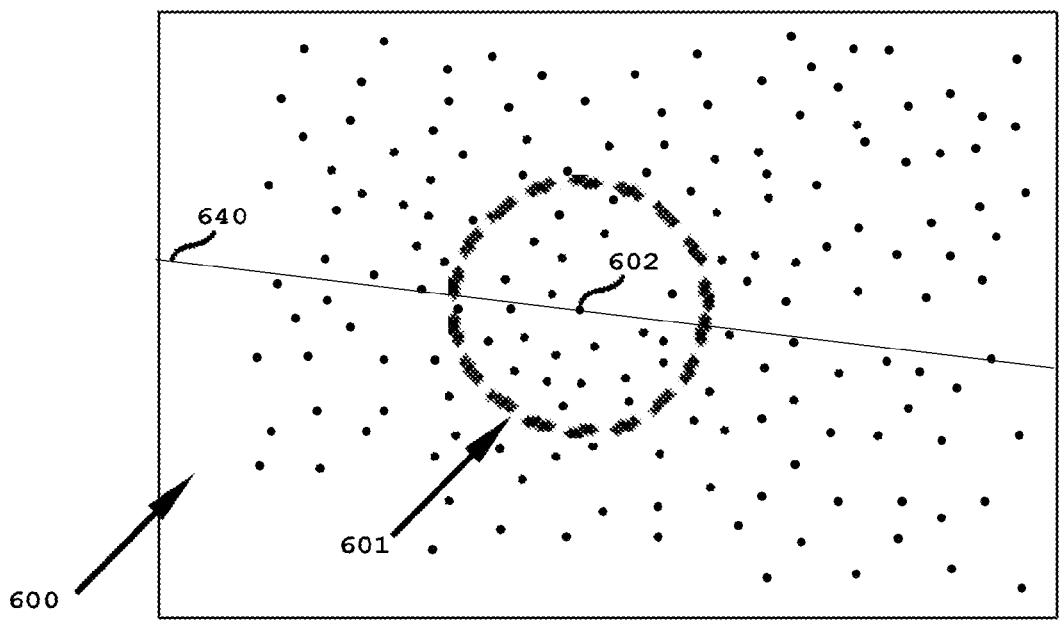
FIG. 6 is an exemplary depiction of random dots captured at image sensor's frame, showing an exemplary dot and neighborhood.

Reference is now being made to FIG. 5 and FIG. 6

Dots 600 are identified in pattern 500 by searching small neighborhoods along epipolar lines, and by calculating similarities at a small number of neighborhoods. Similarity measures are be obtained in a number of ways, with varying degrees of computational complexity.

The preferred technique of present invention for calculating neighborhood similarity is consensus voting because of the small number of operations required to complete.

A subset of dots in pattern 500 on or close to epipolar line 540 are chosen as matching candidates, exemplary of which are dots 502, 504. In addition, in order to minimize errors, pattern 500 may be uncorrelated, to help robust discrimination of neighborhoods.

At a step, image frame dot 602, in set 600 is chosen, and the subset of dots in predefined vicinity 601 collected. Then, neighborhoods 501, 503 corresponding to candidates 502, 504 respectively are searched, dots inside these neighborhoods collected, and epipolar match-test performed.

The neighborhood with most number of epipolar matches is chosen as winning candidate and respective dots identified thereof.

Because calculations are performed over subsets of dots, on or close to epipolar 640, substantial speed up is achieved. Moreover, calculations can be reduced further by reducing the number of tested coordinates splitting the set into two subsets of dots above and below epipolar lines.

For example, dots in 601 located above epipolar 640 are probed against just the dots in 501 and 503 above epipolar 540.

The size of each neighborhood 501, 503, 601 is chosen such that it provides sufficient percentage to carry out consensus voting matching decision. A vote is counted each time a dot passes epipolar match test. Necessary percentage of votes at each neighborhood is linked to physical distribution density of dot pattern. The preferred embodiment of present invention selects all dots inside neighborhoods.
At least a portion of dots inside winning neighborhood are identified during match-testing process.

Validation is carried out by selecting search regions such that a predetermined overlap exists and each dot is independently identified at least twice from adjacent vicinities.

Neighborhoods size in projector frame, are chosen to contain at least an equal amount of dots as in image frame neighborhoods, or a dynamically adjustable percentage.

The matching process has low computational complexity and because operations are localized in small regions, the process is suitable for parallel calculations implementation, where a large number of neighborhoods candidate searches are supplied to independent computing units.

It will become clear to skilled in the art that other similarity measure techniques can be substituted to the one described herein without departing from the scope of present invention. For example, descriptors indicative of local pixels signature to discriminate local regions, remain in the scope of present invention.

Figure 7:
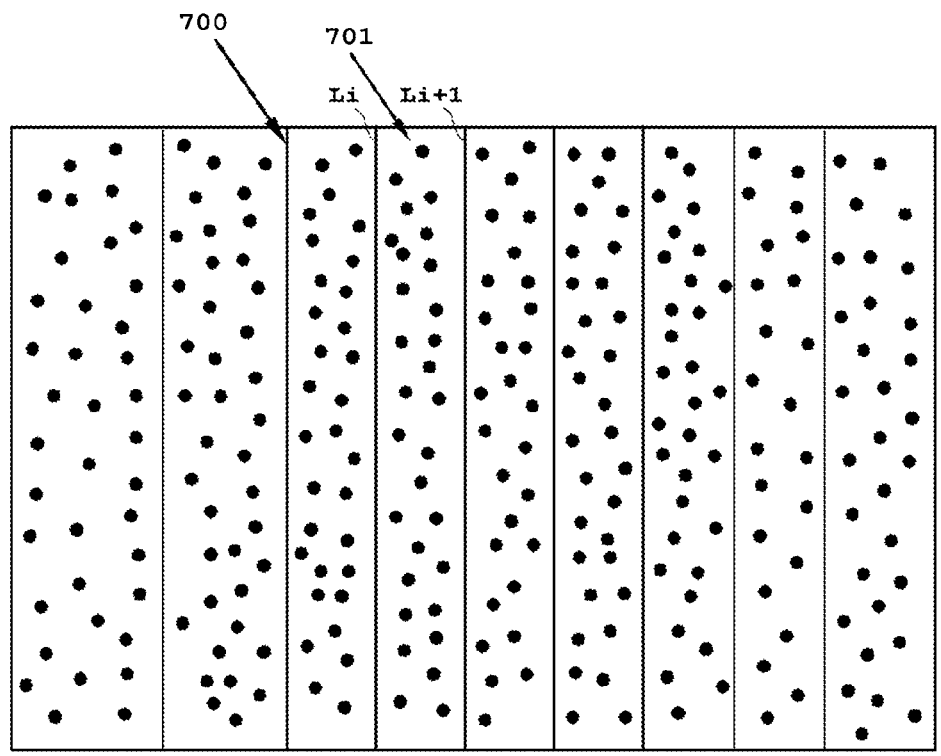
FIG. 7 is an exemplary depiction of random dots and non-crossing strips in projector's frame.
Figure 8:
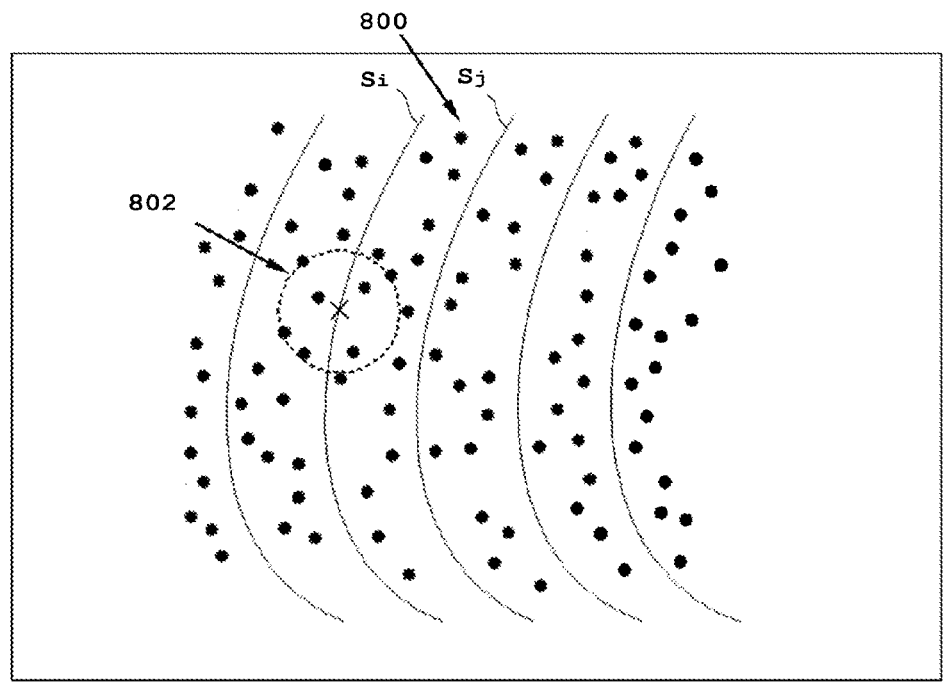
FIG. 8 is an exemplary depiction of random dot and non-crossing strip in image sensor's frame.

Reference is now being made to FIG. 7 and FIG. 8.

A third method of present invention utilizes patterns having a predetermined number of rectilinear strips 700 interspersed with dots 701 positioned at randomly distributed coordinates. Strips 700 have predetermined positions and orientations mostly perpendicular to projector-sensor plane, positioned such that two consecutive strips span a subset (band) of dots 701.

At least a portion of radiation reflected from object surface, which contains a subset of strips 700 and random dots 701, is captured at an image sensor.

At a first step, strips and dots are detected and located in image frame 800 with sub-pixel accuracy.

At a second step, dots in image frame are identified by way of neighborhood configuration localization as described above.

At a third step, a predetermined number of pixels on strip segments $S_i$, $S_j$, which correspond to strip lines $L_i$, $L_{i+1}$ are selected. For example a pixel on $S_i$ is chosen and neighborhood 802 searched.

Dots 802 are looked up and its band information retrieved. A tentative strip identity is assigned when dots on each side of the strips belong to adjacent bands.

The procedure repeats at selected strip pixels and final identity of the strip segment is chosen by majority vote, where a predetermined percent of locations returned same result.

A remarkable advantage of dots and strips pattern is the unique ability to obtain large numbers of frame measurements quickly by point-wise sampling as well as profiling, which advantageously complement each other.

It will be appreciated that many modifications, variations and improvements may occur to the skilled in the art. For example, a dot pattern and a singular strip is a particular case of disclosed method. This configuration can be suitable for a large number of scanning applications, where successive profile samples are assembled in common reference frames facilitated by the support of a large number of dot samples.

In another configuration, a dot pattern and two crossing strips having one intersection point, strips are quickly identified from the relative directions in image frame.

In yet another configuration, a dot pattern and two parallel strips, close to each other, having no dots located in between the two strips, the two strips are identified from relative positions and/or from relative positions of dots.

The possible modification, variations and improvements following the principles of the invention, fall within the spirit of present disclosures and are covered by the present invention.

In an embodiment, projector-sensor system is configured to radiate a number of projection patterns containing dots and strips, projected in succession, where relative strip positions in two consecutive frames are incrementally shifted with respect to image sensor.

When a scene is illuminated by successive patterns a large number of sampling profiles can be collected over a relatively small number of consecutive frames. The profiles can be subsequently assembled by alignment means, and scene's or object's model obtained thereof.

Alignment is facilitated by the large number of samples in each frame and can be carried out by methods well known in the art.

Systems configured for hand-held operations benefit substantially from the methods of present invention, enabling unconstrained and unattached operations, delivering detailed geometries of unprepared surfaces.

The present invention has significant advantages for mobile devices (e.g. tablets, smart phones) applications, because digitization can be achieved in a relatively small number of computations and by simple and low-cost means, such as embedded camera and projector, which become increasingly present in standard configurations.

Mobile devices can be configured such that frame to frame depth map changes may be indicative, for example, of certain commands instructing a device to execute certain actions.

Security applications benefit from present invention for depth-based face recognition.

To achieve ambient light immunity, projected radiation is preferably outside visible spectrum, such as short-wave infrared in the range 700-740 nm (nanometers), which is undetectable by human eye, but detectable by an increasing number of common CMOS monochromatic sensors with good photon efficiency in those regions of the light spectrum.

Surface color can optionally be obtained in a number of modalities. One modality is radiometric decomposition, where projected patterns contain known amounts of radiation wavelengths, where radiation intensity reflected from the scene at a point is proportional with the amount of color at that point. An example is color laser light, utilized in a number of commercial projection engines, where the proportion of primary colors can be computer controlled.

In an embodiment image sensor is a color camera, where each pixel digitizes values of each color component. Determination of the exact color at each pixel is subject to a radiometric calibration step.

Objects characterized by weak geometry (featureless) may adversely impact range frames align results because a unique matching solution may not be found, and as such results in incorrect 3-D models.

One way to address this issue is by including landmarks in the scene, which can be captured and tracked in consecutive frames, from which system's spatial positions (coordinates and orientation) are inferred and alignment performed thereof.

Another way to aid local alignment is by including an inertial sensor, capable to determine relative motion for short durations. Inertial sensors are increasingly commercially available, and are capable to deliver accurate spatial positions that can aid in aligning geometrically challenged surfaces.

The presence of affixed artifacts in the scene is not necessary for the system to work, and is not part of present invention. Also, inertial sensors are not necessary for the system to perform and are not included in this invention.

Inertial sensors and laser projectors may be more and more frequently found in various mobile platform configurations, and as such, the methods of present invention are a good fit for spatial sensing applications on an increasing number of devices.

In an embodiment, surface color is obtained by configuring a color capable image sensor and a monochromatic image sensor having overlapping field of views, to record digital frames simultaneously.

In such setup, the monochromatic sensor can be sensitive to a portion of projected radiation spectrum, which may or may not be visible radiation, obtaining frame coordinate thereof, whereas the color sensor can be sensitive to a portion of the spectrum, which may or may not be contained in projected radiation.

Color information can be assembled from a plurality of pixel intensities recorded by the color sensor and possibly, but not necessarily, from intensities recorded by the monochromatic sensor.

What is claimed is:

1. A method for obtaining three-dimensional coordinates of physical scenes comprising steps of:

(a) illuminating a scene by at least one radiation pattern emanating from a projector frame, having a predetermined number of mostly rectilinear strips, each said strip having a predetermined position and orientation, having said strips interspersed with distinguishable dots, having said dots positioned at random coordinates and having predetermined distribution density;
(b) recording at least a portion of said strips and said dots reflected by said illuminated scene in at least one digital frame in the form of profiles and dots of illuminated pixels corresponding to said at least a portion of said strips and said dots;
(c) locating said profiles and said dots pixel-coordinates in said at least one digital frame;
(d) identifying at least a subset of said dots in said at least one digital frame by corresponding dots in said projector frame;
(e) identifying at least a subset of said profiles in said at least one digital frame by corresponding strips in said projector frame from said subset of dots in said projector frame;
(f) calculating three-dimensional measurements corresponding to said subset of dots and said subset of profiles in said at least one digital frame by triangulating coordinates of said subset of dots and said strips in said projector frame in a local frame of coordinates.

2. A method for obtaining three-dimensional coordinates of physical scenes comprising steps of:
(a) illuminating a scene by at least one radiation pattern emanating from a projector frame, having a predetermined number of mostly rectilinear strips, each said strip having a predetermined position and orientation, having at least some of said strips intersecting other said strips, having said strips interspersed with distinguishable dots, having said dots positioned at random coordinates and having predetermined distribution density;
(b) recording at least a portion of said strips and said dots reflected by said illuminated scene in at least one digital frame in the form of profiles and dots of illuminated pixels corresponding to said portions of said strips and said portion of said dots;
(c) locating said profiles pixels coordinates and said dots coordinates in said at least one digital frame;
(d) identifying at least a subset of said dots in said at least one digital frame by said corresponding dots in said projector frame;
(e) identifying at least a subset of said profiles in said at least one digital frame from said subset of dots coordinates in said projector frame;
(f) calculating three-dimensional measurements corresponding to said subset of profiles and said subset of said dots in said at least one digital frame by triangulating coordinates of said subset of said dots and said strips in said projector frame in a local frame of coordinates.

3. A digitization system comprising:
(a) at least one projection assembly configured to emanate at least one radiation pattern onto a scene, wherein said pattern comprises a predetermined number of mostly rectilinear strips, wherein said strips have predetermined position and orientation, wherein said strips have interspersed distinguishable dots, wherein said dots are positioned at random coordinates and have predetermined distribution density;
(b) at least one image capture assembly configured to capture radiation reflected from said scene in at least one digital frame, wherein said digital frame comprises at least some of said strips in form of profiles of illuminated pixels profiles, and at least some of said dots in form of illuminated pixels groupings;
(c) at least one computing unit configured to:
  (i) determine location of said at least some of said dots and said at least some of said profiles in said at least one digital frame;
  (ii) identify at least a subset of said at least some of said dots in said at least one digital frame by corresponding said dots in said radiation pattern;
  (iii) identify at least a subset of said at least some of said profiles in said at least one digital frame by corresponding said strips in said radiation pattern;
  (iv) calculate three-dimensional coordinates of said at least a subset of said dots and said at least a subset of said profiles in said at least one digital frame.

* * * * *